Sept. 20, 1927. 1,642,987
F. LJUNGSTRÖM ET AL
TURBINE DRIVEN LOCOMOTIVE PROVIDED WITH MECHANICAL
POWER TRANSMISSION
Filed April 13, 1922 5 Sheets-Sheet 4

Inventors
F. Ljungström
I. Broberg
By Marks&Clerk
Attys.

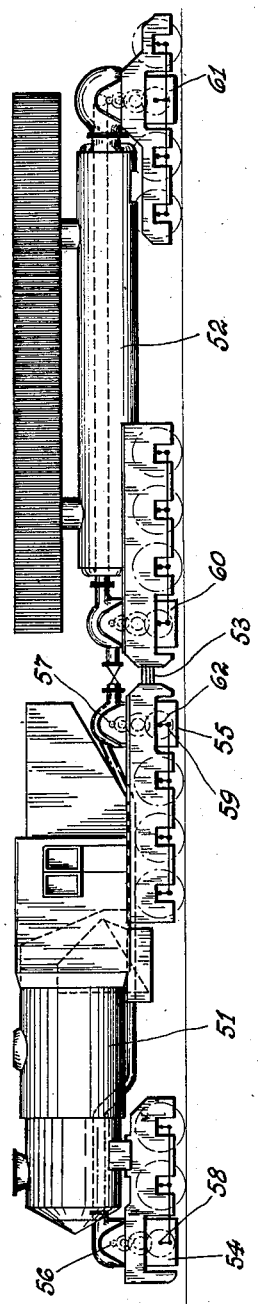

Patented Sept. 20, 1927.

1,642,987

UNITED STATES PATENT OFFICE.

FREDRIK LJUNGSTRÖM, OF LIDINGON-BREVIK, AN ISIDOR BROBERG, OF SKARSATRA, LIDINGON, SWEDEN, ASSIGNORS TO AKTIEBOLAGET LJUNGSTRÖMS ÅNGTURBIN, OF STOCKHOLM, SWEDEN, A CORPORATION.

TURBINE-DRIVEN LOCOMOTIVE PROVIDED WITH MECHANICAL-POWER TRANSMISSION.

Application filed April 13, 1922, Serial No. 552,412, and in Sweden February 23, 1922.

In turbine driven locomotives, constructions are known in which the power of the driving turbine is transmitted to the driving wheels by means of a mechanical power transmission, consisting of spur gears for two consecutively arranged toothed gearings for the reduction of the speed of the turbine. It has also been proposed not to employ the slowest-rotating shaft of the toothed gearing as a driving shaft, but only as a lay shaft connected with the driving wheels by means of coupling rods. The given load profile as well as the limited space have caused difficulties, particularly in slower running freight locomotives, to effect the desired gearing down of the speed within the limited space. The present invention has for its object to remove these drawbacks by a mechanical power transmission facilitating a marked reduction within a small space, of the speed of the fast-running turbine.

The invention relates to an arrangement in turbine-driven locomotives which are provided with mechanical power transmitting means consisting of a toothed gearing operating with spur wheels, and the invention is principally characterized by the toothed gearing comprising gear wheels for at least three consecutive gear-ratios reducing the speed of the turbine. The invention consists further in arrangements for mounting these spur gears between the turbine and the driving wheels.

Figure 1:
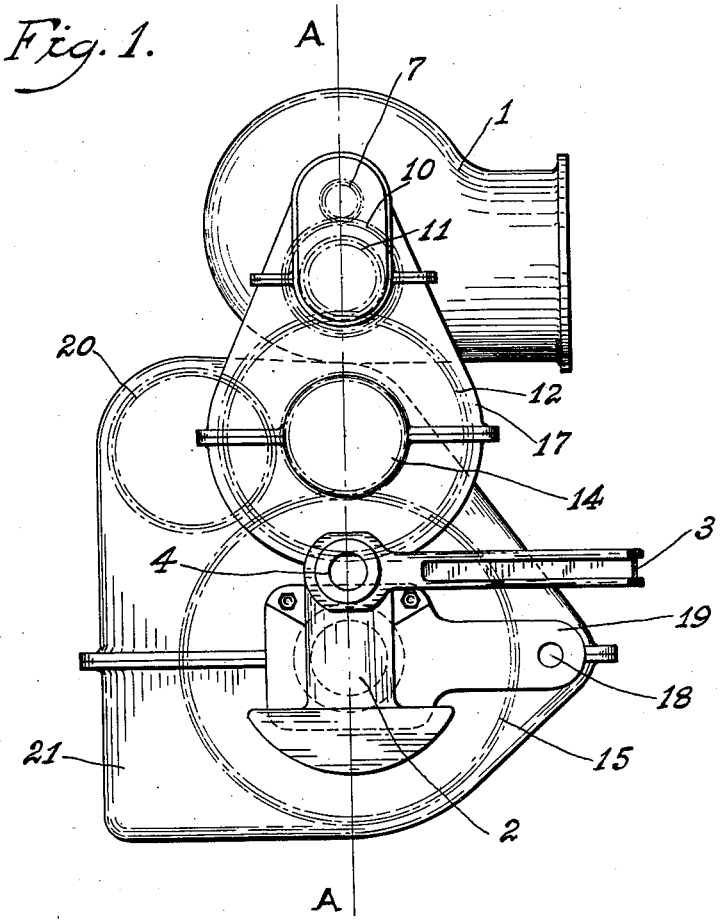
Figure 2:
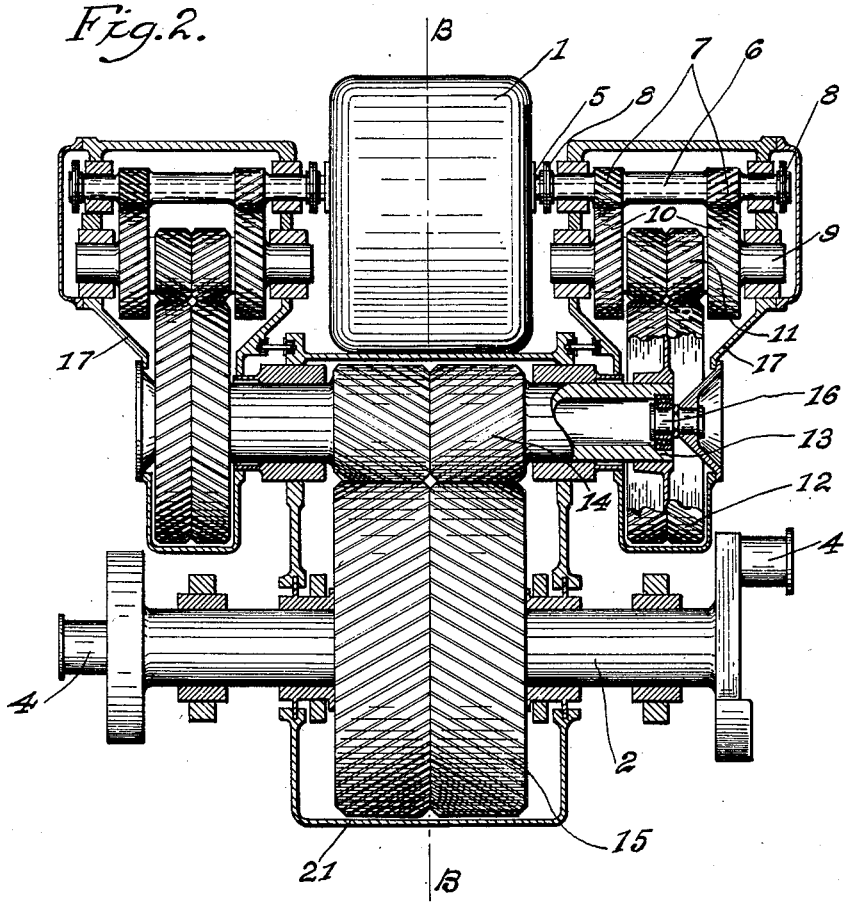
Figure 3:
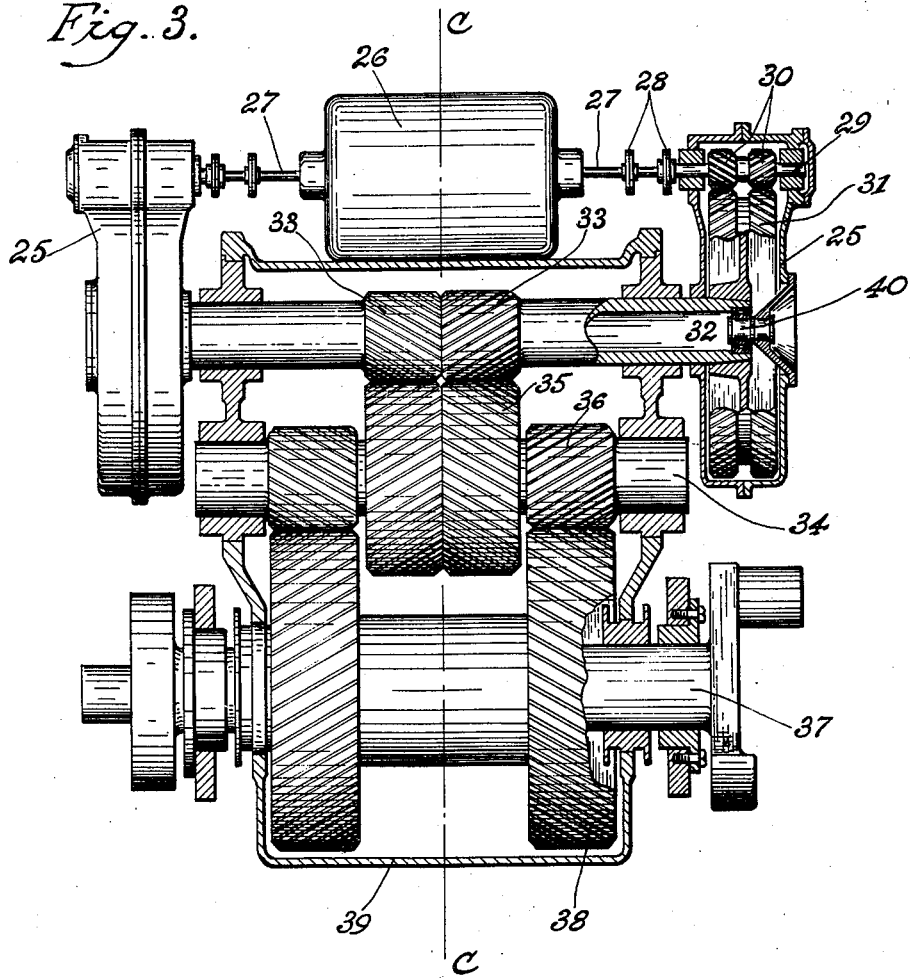

The accompanying drawings illustrate two embodiments of the invention with three gear-ratios for the reduction of the speed. Fig. 1 shows an elevation of an embodiment of the gearing down device, and Fig. 2 is a section thereof on line A—A of Fig. 1. Fig. 3 shows a section of a second embodiment of the invention on line D—D of Fig. 4, which shows an elevation of this embodiment with certain parts broken away. Fig. 5 shows an elevation of a locomotive provided with gearing down devices constructed in accordance with the invention.

In Figs. 1 and 2, 1 denotes the turbine and 2 the lay shaft connected with the cranks of the driving axles by means of coupling rods 3 connected with the cranks 4. The gearing is a double one, in that the same is symmetrical along the line B—B in Fig. 2. The turbine shaft 5 is coupled to the shaft 6 of the first pinion 7 of the toothed gearing, by means of diaphragm couplings 8. The pinion shaft 6 is hollow and comprises a second shaft which is connected by means of diaphragms, partly with the said pinion shaft 6 and partly with the turbine shaft 5. The pinions 7 drive the gear wheels 10 which are attached onto the same shaft 9 as the smaller pinions 11. These latter pinions 11 drive the gear wheels 12 which are attached onto a shaft 13 extending through the whole gearing and which carry the pinions 14, which, finally, drive the gear wheels 15 attached onto the lay shaft 2. In this embodiment the pinions 7 and 11 are mounted together with their shafts in a casing 17 which is spherically journalled inside the shaft 13 by means of a spherical bearing 16 so as to be movable in all directions, said casing in known manner bringing about a uniform tooth pressure in the gearing and eliminating certain injurious forces which would otherwise be transmitted to the turbine and interfere with the operation thereof. The casing obtains a certain margin of movement by reason of the existence of the diaphragm 8. The casing 17 carries the two smaller shafts 6 and 9.

Reversal is effected in known manner by the lay shaft 2, which is mounted in the frame 19 movably about the point 18, being lowered so that the gear wheel 15 attached onto this shaft 2 will be brought out of engagement with the pinion 14, whereupon an additional gear wheel 20 adapted for reverse running is brought into engagement with the pinion 14 as well as with the gear wheel 15, for instance by means of an eccentric movement not shown in the drawing. In addition to the toothed gearing being in this case symmetrical with respect to the line B—B, it is also, so to say, divided into two parts, one of which is enclosed in the movable casing 17, while the other is enclosed in the gear box 21 which is mounted on the frame of the locomotive, for instance in such a manner as to give the gear box a certain margin of movement.

Figure 4:
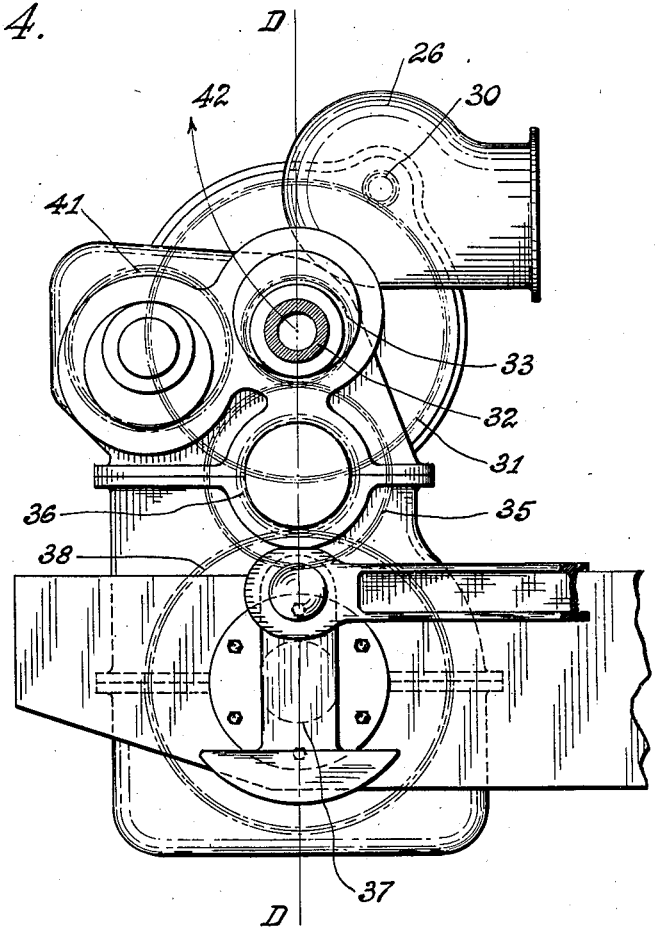

In the embodiment shown in Figs. 3 and 4, the gearing is also symmetrical along a line, that is line C—C, in Fig. 3. 26 designates the driving turbine and 27 the turbine shaft which is surrounded in known manner by two diaphragms 28 connecting the turbine shaft with the first shaft 29 of the toothed gearing. Attached to this shaft 29 are the pinions 30, driving the gear wheels 31 which are attached to shaft 32. From this shaft, the gear wheels 35 attached to the shaft 34 are driven by the pinions 33. Mounted on the same shaft 34 are smaller gear wheels 36, driving the gear wheels 38 attached to the lay shaft 37. The lay shaft 37 is connected with the driving wheels of the locomotive by means of coupling rods and, together with the shafts 34 and 32, is mounted within a gear box 39 which is located substantially underneath the turbine 26. The pinions 30 with their shaft 29 are mounted in a movable casing 25 in a manner above described and previously known, said casing 25 being spherically journalled inside the shaft 32 by means of a ball bearing 40 so as to be movable in all directions.

In this toothed gearing reversal is obtained by an additional gear wheel 41 (Fig. 4) being eccentrically mounted in the frame in such a manner that it may be rotated into engagement with the gear wheel 35. Before this throwing into gear takes place, the pinions 33 and the gear wheels 35 are brought out of engagement with each other by the shaft 32 being swung by means of the movable casing 25, in the direction of the arrow 42, until it meets the reversing pinion 41 and is brought into engagement therewith. In this embodiment, too, the gearing is in a certain sense divided in two parts, one of which is situated in the gear box 39, while the other is located in the movable casing 25.

Other embodiments of toothed gearings having three gear-ratios for the reduction of the speed may be conceived, without the principle of the invention being departed from. For instance, the gearing need not be symmetrical, but the turbine may, for example, be adapted so as to drive only with the one shaft end thereof. However, the advantages of symmetrical gearings are obvious, in that oblique forces and axial pressures in the shaft are eliminated through the possibility of using two gears having their teeth cut obliquely with respect to each other, or so-called herringbone wheels. In a manner described herein above, the gear box 39 may be mounted so as to be movable on the frame. The gear wheels may be mounted in the gear box on principles other than the above mentioned one, and they may be constructed in some other suitable way.

The mounting of the machine set on the locomotive evidently does not affect the scope of the present invention. Fig. 5 on the drawing shows, as mentioned above, a locomotive provided with gearings constructed in accordance with the invention, the locomotive being of the type in which a condenser pertaining to the locomotive is mounted on a separate boiler car. Then 51 denotes the boiler car and 52 the condenser car, said cars being connected with each other by means of a coupling 53 of known type. Mounted on the boiler car 51 are two turbine sets 54 and 55, each provided with a toothed gearing comprising three gear-ratios for the reduction of the speed, said device gearing down the speed from that of the turbine shaft 56 and 57 respectively to the speed of the lay shafts 58 and 62 respectively. On the condenser car 52 there are also mounted two turbine sets 59 and 60, which are also provided with toothed gearings comprising three gear-ratios for the reduction of the speed. In the embodiment shown the turbines are connected as high pressure and low pressure turbines, in that the live steam, which first passes the turbine 58, will then flow through the turbines 59, 60 and 61 in the order named. Obviously, however, other connecting means are also conceivable. The locomotive may also be conceived as provided with one turbine only having a toothed gearing mounted in any of the places shown in the drawing. The turbine set may, without the principle of the invention being departed from, be mounted in any other place of the locomotive, in that the four given places are only to be regarded as the most suitable ones for the mounting of the turbine sets.

What we claim as new and desire to secure by Letters Patent of the United States is:—

1. A turbine driven locomotive having mechanical power transmitting means interposed between the turbine and the driving wheels of the locomotive, said power transmitting means comprising spur gears for at least three consecutive gear ratios for the reduction of the speed of the turbine, the slowest-running shaft of the spur gearing, without being itself a driving wheel axle, being connected by means of coupling rods to at least one of the driving wheel axles, the spur gearing being symmetrical with respect to a plane perpendicular to the axes of the gear wheels, and the turbine being situated between the first, fastest-running gears, said gears being disposed in spherically movable casings located outside the consecutive portion of the spur gearing, and a box surrounding said latter portion of the gearing.

2. A turbine-driven locomotive having mechanical power transmitting means interposed between the turbine and the driving wheels of the locomotive, said power transmitting means comprising spur gears for at least three consecutive gear ratios for the reduction of the speed of the turbine, a toothed wheel adapted for reversal, means for throwing said toothed wheel into and out of engagement with at least two adjacent spur wheels of the gearing, and means for throwing one of said latter spur wheels into and out of engagement with said toothed wheel and with said adjacent spur wheel, the slowest running shaft of the spur gearing without being itself a driving wheel axle being connected by means of coupling rods to at least one of the driving wheel axles.

In testimony whereof we affix our signatures.

FREDRIK LJUNGSTRÖM.
ISIDOR BROBERG.